US007749397B2

(12) United States Patent
Anderson et al.

(10) Patent No.: US 7,749,397 B2
(45) Date of Patent: Jul. 6, 2010

(54) LOW EJECTION ENERGY MICRO-FLUID EJECTION HEADS

(75) Inventors: Frank E. Anderson, Sadieville, KY (US); Byron V. Bell, Paris, KY (US); Robert W. Cornell, Lexington, KY (US); Yimin Guan, Lexingotn, KY (US)

(73) Assignee: Lexmark International, Inc., Lexington, KY (US)

( * ) Notice: Subject to any disclaimer, the term of this patent is extended or adjusted under 35 U.S.C. 154(b) by 673 days.

(21) Appl. No.: 11/673,795

(22) Filed: Feb. 12, 2007

(65) Prior Publication Data

US 2007/0126773 A1 Jun. 7, 2007

Related U.S. Application Data

(62) Division of application No. 10/927,796, filed on Aug. 27, 2004, now Pat. No. 7,195,343.

(51) Int. Cl.
*G01D 15/00* (2006.01)
*G11B 5/127* (2006.01)

(52) U.S. Cl. .............................. 216/27; 216/21; 438/21

(58) Field of Classification Search ................... 216/27, 216/21; 438/21

See application file for complete search history.

(56) References Cited

U.S. PATENT DOCUMENTS 4,535,343 A 8/1985 Wright et al.
4,694,306 A 9/1987 Ikeda et al.
4,777,494 A 10/1988 Shibata et al.
4,860,033 A 8/1989 Shiozaki et al.
4,931,813 A 6/1990 Pan et al.
4,936,952 A * 6/1990 Komuro ...................... 216/27
4,956,653 A 9/1990 Braun
4,990,939 A 2/1991 Sekiya et al.
5,066,963 A 11/1991 Kimura et al.
5,081,473 A 1/1992 Hawkins et al.
5,580,468 A * 12/1996 Fujikawa et al. .............. 216/27
5,636,441 A 6/1997 Meyer et al.
5,682,188 A 10/1997 Meyer et al.
5,831,648 A 11/1998 Mitani et al.
5,844,586 A * 12/1998 Berry et al. ................... 347/59
5,883,650 A 3/1999 Figueredo et al.
5,980,025 A 11/1999 Burke et al.

(Continued)

OTHER PUBLICATIONS

Ping-Hei Chen et al, Droplet Formtion of a Thermal Sideshooter Inkjet Printhead, Apr. 2, 1998, International Journal of Heat and Flow, vol. 19, pp. 382-390.*

*Primary Examiner*—Binh X Tran
*Assistant Examiner*—Stephanie Duclair

(57) ABSTRACT

A micro-fluid ejection device structure and method therefor having improved low energy design. The devices includes a semiconductor substrate and an insulating layer deposited on the semiconductor substrate. A plurality of heater resistors are formed on the insulating layer from a resistive layer selected from the group consisting of TaAl, Ta2N, TaAl(O,N), TaAlSi, Ti(N,O), WSi(O,N), TaAlN, and TaAl/TaAlN. A sacrificial layer selected from an oxidizable metal and having a thickness ranging from about 500 to about 5000 Angstroms is deposited on the plurality of heater resistors. Electrodes are formed on the sacrificial layer from a first metal conductive layer to provide anode and cathode connections to the plurality of heater resistors. The sacrificial layer is oxidized in a plasma oxidation process to provide a fluid contact layer on the plurality of heater resistors.

8 Claims, 10 Drawing Sheets

U.S. PATENT DOCUMENTS

| | | | |
|---|---|---|---|
| 6,013,160 | A | 1/2000 | Raisanen et al. |
| 6,142,612 | A | 11/2000 | Whitman |
| 6,161,924 | A | 12/2000 | Mitani et al. |
| 6,224,191 | B1 | 5/2001 | Saito et al. |
| 6,293,654 | B1 | 9/2001 | Pidwerbecki |
| 6,299,294 | B1 | 10/2001 | Regan |
| 6,315,384 | B1 | 11/2001 | Ramaswami et al. |
| 6,331,049 | B1 | 12/2001 | Leban |
| 6,336,713 | B1 | 1/2002 | Regan et al. |
| 6,341,848 | B1 | 1/2002 | Shade et al. |
| 6,467,884 | B1 | 10/2002 | Murooka et al. |
| 6,491,377 | B1 | 12/2002 | Cleland et al. |
| 6,532,027 | B2 | 3/2003 | Ozaki et al. |
| 6,575,563 | B1 | 6/2003 | Cornell |
| 6,598,961 | B2 | 7/2003 | Kuk et al. |
| 6,637,866 | B1 | 10/2003 | Cornell et al. |
| 6,644,790 | B2 | 11/2003 | Ozaki et al. |
| 6,663,228 | B2 | 12/2003 | Saito et al. |
| 6,676,246 | B1 | 1/2004 | Anderson et al. |
| 6,715,859 | B2 | 4/2004 | Pan |
| 6,719,406 | B1 | 4/2004 | Silverbrook et al. |
| 7,195,343 | B2 | 3/2007 | Anderson et al. |
| 2002/0130927 | A1 | 9/2002 | Miyakoshi et al. |
| 2002/0172064 | A1 * | 11/2002 | Chen ............................ 365/1 |
| 2003/0071877 | A1 | 4/2003 | Hess |
| 2003/0151646 | A1 | 8/2003 | Miyamoto et al. |
| 2003/0231228 | A1 | 12/2003 | Cox et al. |

* cited by examiner

LOW EJECTION ENERGY MICRO-FLUID EJECTION HEADS

RELATED APPLICATIONS

This application is a division of application Ser. No. 10/927,796, filed Aug. 27, 2004, now U.S. Pat. No. 7,195,343.

FIELD OF THE DISCLOSURE

The disclosure relates to compositions and methods that are effective to lower ejection energies for a micro-fluid ejection device.

BACKGROUND

Micro-fluid ejection devices have been used in various devices for a number of years. A common use of micro-fluid ejection devices includes inkjet heater chips found in inkjet printheads. Despite their seeming simplicity, construction of micro-fluid ejection devices requires consideration of many interrelated factors for proper functioning.

The current trend for ink jet printing technology (and micro-fluid ejection devices generally) is toward lower jetting energy, greater ejection frequency, and, in the case of printing, higher print speeds. A minimum quantity of thermal energy must be present on a heater surface in order to vaporize a fluid inside a micro-fluid ejection device so that the fluid will vaporize and escape through an opening or nozzle. In the case of an ink jet printhead, the overall energy or "jetting energy" must pass through a plurality of layers before the requisite energy for fluid ejection reaches the heater surface. The greater the thickness of the layers, the more jetting energy will be required before the requisite energy for fluid ejection can be reached on the heating surface. However, a minimum presence of protective layers is necessary to protect the heater resistor from chemical corrosion, from fluid leaks, and from mechanical stress from the effects of cavitation.

One way to increase the printing speed is to include more ejectors on a chip. However, more ejectors and higher ejection frequency create more waste heat, which elevates the chip temperature and results in ink viscosity changes and variation of the chip circuit operation. Eventually, ejection performance and quality will be degraded due to an inability to maintain an optimum temperature for fluid ejection. Hence, there continues to be a need for improved micro-fluid ejection devices having reduced jetting energy for higher frequency operation.

SUMMARY

With regard to the foregoing, the disclosure provides an improved micro-fluid ejection head having reduced jetting energy. One skilled in the art understands that jetting energy is proportional to the volume of material that is heated during an ejection sequence. Hence, reducing the heater overcoat thickness will reduce jetting energy. However, as the overcoat thickness is reduced, corrosion of the ejectors becomes more of a factor with regard to ejection performance and quality.

In this disclosure, an improved structure for a heater stack is provided. The heating stack structure includes a semiconductor substrate on which an insulating layer is deposited. A resistive layer covers the insulating layer. A plurality of heater resistors are formed throughout the resistive layer which is selected from the group consisting of TaAl, $Ta_2N$, TaAl(O,N), TaAlSi, TaSiC, Ti(N,O), Wsi(O,N), TaAlN and TaAl/Ta. A sacrificial layer comprising an oxidizable metal is deposited with a thickness ranging from about 500 to about 5000 Angstroms on the layer of heater resistors. As deposited, the sacrificial layer has conductive properties. An additional metal layer, referred to herein as the "conductive layer," is deposited on the sacrificial layer so that the additional metal layer or "conductive layer" can be fashioned to form electrodes which provide anode and cathode connections to the plurality of heater resistors. The exposed portion of the sacrificial layer is oxidized such that the exposed portion of the sacrificial layer provides a protective fluid contact layer on the heater resistors. The remaining unreacted portions of the sacrificial layer maintain their conductive properties so that there is minimal resistance between the resistive layer and the electrodes.

In another embodiment, the disclosure provides a method of making a micro-fluid ejection head structure. The method includes the steps of providing a semiconductor substrate, and depositing an insulating layer on the substrate. The insulating layer having a thickness ranging from about 8,000 to about 30,000 Angstroms. A resistive layer is deposited on the insulating layer. The resistive layer has a thickness ranging from about 500 to about 1,500 Angstroms and may be selected from the group consisting of TaAl, $Ta_2N$, TaAl(O,N), TaAlSi, TaSiC, Ti(N,O), Wsi(O,N), TaAlN and TaAl/Ta. A sacrificial layer is deposited on the resistive layer. The sacrificial layer has a thickness ranging from about 500 to about 5,000 Angstroms and may be selected from the group consisting of tantalum (Ta), and titanium (Ti). A plurality of heater resistors is defined in the resistive layer and sacrificial layer. A conductive layer is deposited on the sacrificial layer. The conductive layer is etched to define ground and address electrodes and a heater resistor therebetween. A dielectric layer is deposited on the heater resistor and corresponding electrodes. The dielectric layer has a thickness ranging from about 1,000 to about 8,000 Angstroms and is selected from the group consisting of silicon dioxide, diamond-like carbon (DLC), and doped DLC. The dielectric layer is developed to expose the sacrificial layer to a fluid chamber. Subsequently, the exposed portion of the sacrificial layer is passivated by a chemical process such as oxidization.

One advantage of embodiments of the disclosure can be better heater performance due to the reduced overall overcoat thickness. This reduction in overcoat thickness translates into higher heating efficiency and higher frequency jetting. Another benefit of embodiments of the disclosure can be that process costs will be lower because an entire mask level used in a conventional method of manufacture may be eliminated. Additionally, the method of manufacture is compatible with the current process of manufacture, so that manufacturers using this process do not require additional capital equipment for construction of micro-fluid ejection devices.

BRIEF DESCRIPTION OF THE DRAWINGS

Further advantages of embodiments of the disclosure may be apparent by reference to the detailed description of exemplary embodiments when considered in conjunction with the following drawings, in which like reference numbers denote like elements throughout the several views, and wherein.

DETAILED DESCRIPTION OF THE EXEMPLARY EMBODIMENTS

Figure 1:
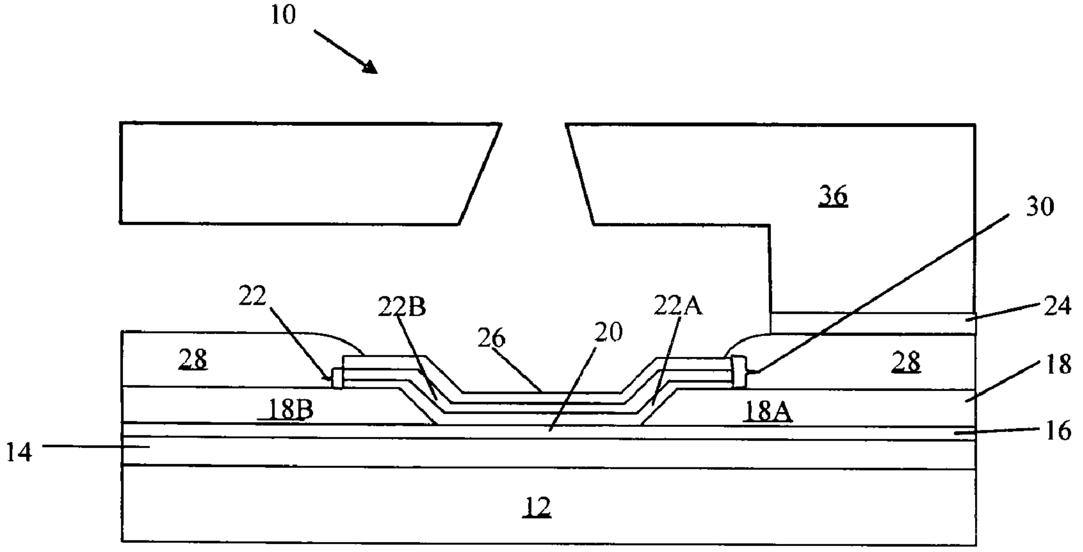
FIG. 1 PRIOR ART
FIG. 1 is a cross-sectional view, not to scale, of a portion of a prior art micro-fluid ejection head structure in the form of a portion of an ink jet printhead.
Figure 2:
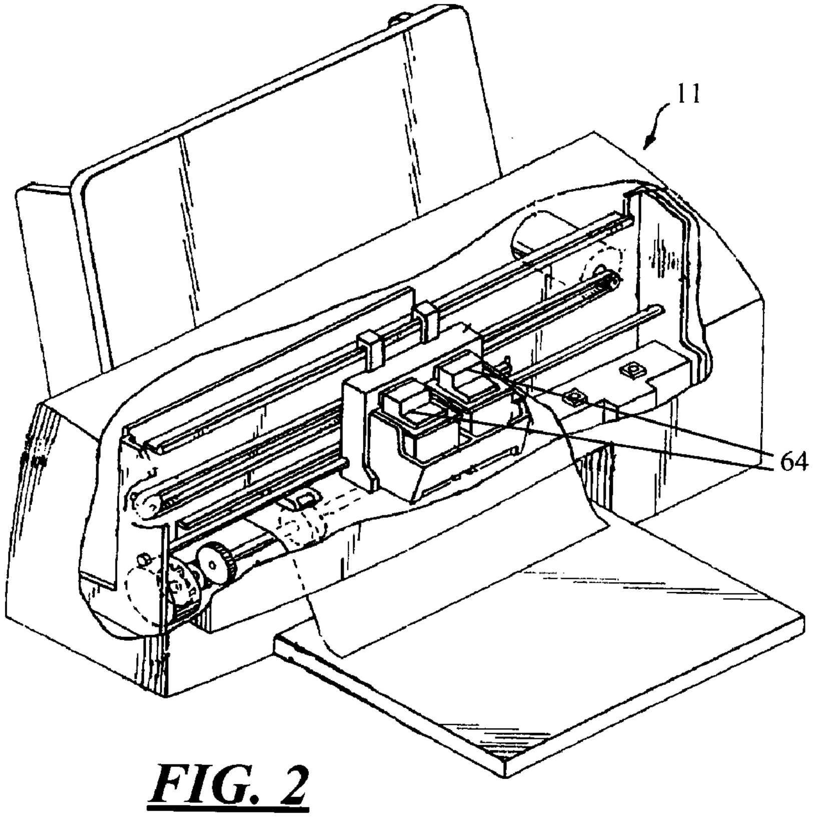
FIG. 2 is an illustration, in perspective view, of a conventional micro-fluid ejection device in the form of a printer.

With reference to FIG. 1, there is illustrated in a cross-sectional view, not to scale, a portion of a prior art micro-fluid ejection head structure 10 for a micro-fluid ejection device such as a printer 11 (FIG. 2). The micro-fluid ejection head structure 10 includes a semiconductor substrate 12, typically made of silicon; an insulating layer 14, made of silicon dioxide, phosphorus doped glass (PSG) or boron; and phosphorus doped glass (BSPG) deposited or grown on the semiconductor substrate. The insulating layer 14 has a thickness ranging from about 8,000 to about 30,000 Angstroms. The semiconductor substrate 12 typically has a thickness ranging from about 100 to about 800 microns or more.

A resistive layer 16 is deposited on the insulating layer 14. The resistive layer 16 may be selected from TaAl, $Ta_2N$, TaAl(O,N), TaAlSi, TaSiC, Ti(N,O), WSi(O,N), TaAlN and TaAl/Ta and has a thickness ranging from about 500 to about 1,500 Angstroms.

A conductive layer 18 is deposited on the resistive layer 16 and is etched to provide power and ground conductors 18A and 18B for a heater resistor 20 defined between the power and ground conductors 18A and 18B. The conductive layer 18 may be selected from conductive metals, including but not limited to, gold, aluminum, silver, copper, and the like and has a thickness ranging from about 4,000 to about 15,000 Angstroms.

A passivation layer 22 is deposited on the heater resistor 20 and a portion of conductive layer 18 to protect the heater resistor 20 from fluid corrosion. The passivation layer 22 typically consists of composite layers of silicon nitride (SiN) 22A and silicon carbide (SiC) 22B with SiC being the top layer. The passivation layer 22 has an overall thickness ranging from about 1,000 to about 8,000 Angstroms.

A cavitation layer 26 is then deposited on the passivation layer overlying the heater resistor 20. The cavitation layer 26 has a thickness ranging from about 1,500 to about 8,000 Angstroms and is typically composed of tantalum (Ta). The cavitation layer 26, also referred to as the "fluid contact layer" provides protection of the heater resistor 20 from erosion due to bubble collapse and mechanical shock during fluid ejection cycles.

Overlying the power and ground conductors 18A and 18B is another insulating layer or dielectric layer 28 typically composed of epoxy photoresist materials, polyimide materials, silicon nitride, silicon carbide, silicon dioxide, spun-on-glass (SOG), laminated polymer and the like. The insulating layer 28 provides insulation between a second metal layer 24 and conductive layer 18 and has a thickness ranging from about 5,000 to about 20,000 Angstroms.

One disadvantage of the micro-fluid ejection head structure 10 described above is that the multiplicity of protective layers or heater overcoat layers 30 within the micro-fluid ejection head structure 10 increases the thickness of the heater overcoat layer 30, thereby increasing the overall jetting energy requirement. As set forth above, the heater overcoat layer 30 consists of the composite passivation layer 22 and the cavitation layer 26.

Upon activation of the heater resistor 20, some of the energy ends up as waste heat-energy used to heat the overcoat layer 30 via conduction—while the remainder of the energy is used to heat the fluid on the surface of the cavitation layer 26. When a surface of the heater resistor 20 reaches a fluid superheat limit, a vapor bubble is formed. Once the vapor bubble is formed, the fluid is thermally disconnected from the heater resistor 20. Accordingly, the vapor bubble prevents further thermal energy transfer to the fluid.

Figure 3A:
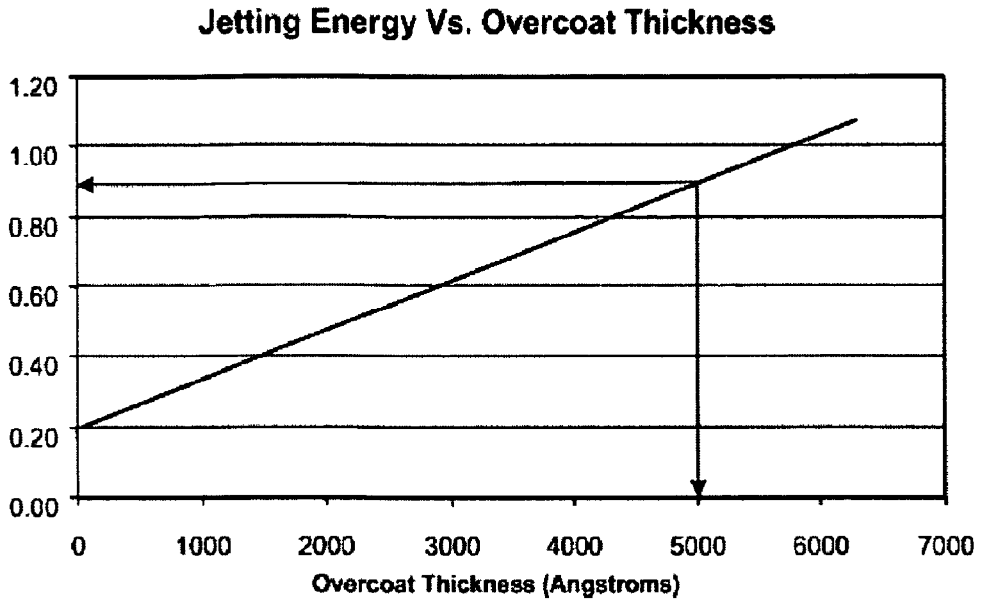
FIG. 3A is a graphical representation of a relationship between jetting energy and overcoat thickness.

It is the thermal energy transferred into the fluid, prior to bubble formation that drives the liquid-vapor change of state of the fluid. Since thermal energy must pass through the overcoat layer 30 before heating the fluid, the overcoat layer 30 is also heated. It takes a finite amount of energy to heat the overcoat layer 30. The amount of energy required to heat the overcoat layer 30 is directly proportional to the thickness of the overcoat layer 30. An illustrative example of the relationship between the overcoat layer thickness and energy requirement for a specific heater resistor 20 size is shown in FIG. 3A. The example given in FIG. 3A is for illustrative purposes only and is not intended to limit the embodiments described herein.

Jetting energy is important because it is related to power (power being the product of energy and firing frequency of the heater resistors 20). Substrate temperature rise is related to power. Adequate jetting performance and fluid characteristics, such as print quality in the case of an ink ejection device, are related to the substrate temperature rise.

Figure 3B:
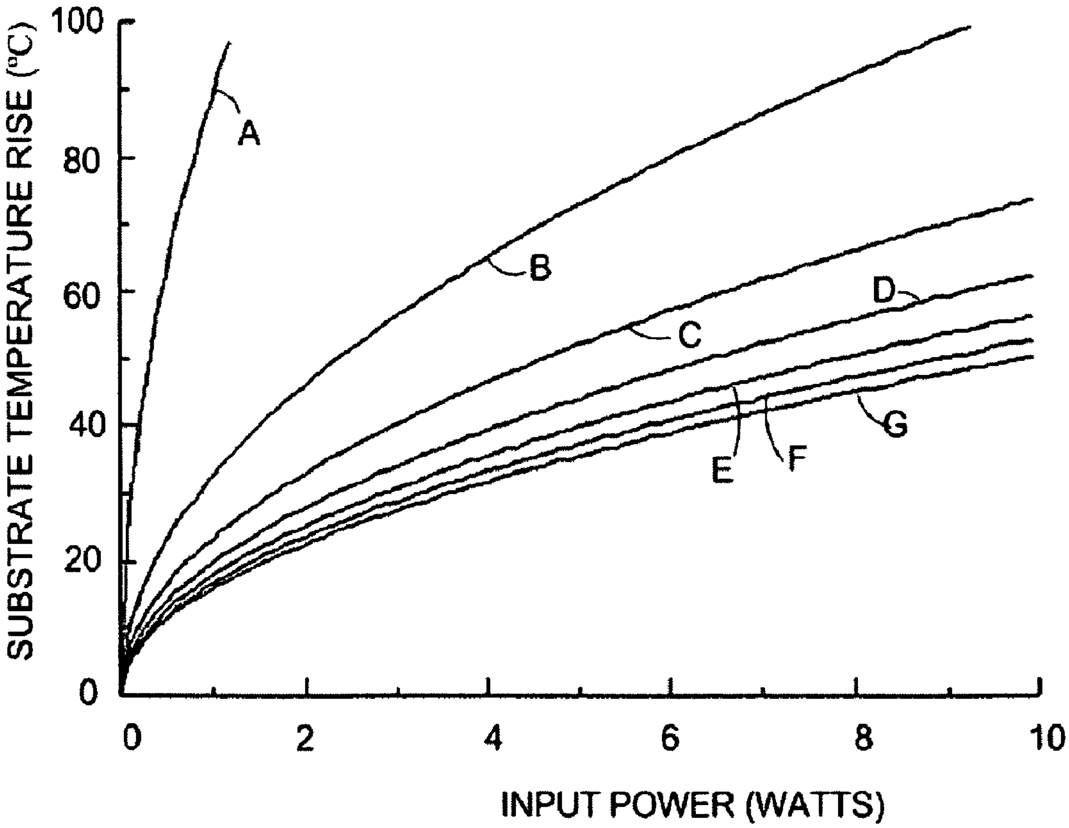
FIG. 3B is a graphical representation of a relationship between power, substrate temperature rise and droplet size.

FIG. 3B illustrates a relationship among substrate temperature rise, input power to the heater resistor 20, and droplet size. The independent axis of FIG. 3B has units of power (or energy multiplied by frequency). In FIG. 3B dependent axis denotes the temperature rise of the substrate 12. The series of curves (A-G) represent varying levels of pumping effectiveness for fluid droplet sizes (in this example, ink droplet sizes) of 1, 2, 3, 4, 5, 6, and 7 picoliters respectively. Pumping effectiveness is defined in units of picoliters per microjoule. Obviously, it is desirable to maximize pumping effectiveness. For the smaller droplet sizes (curves A and B), very little power input results in a rapid rise in the substrate temperature. As the droplet size increases (curves C-G), the substrate temperature rise is less dramatic. When a certain substrate temperature rise is reached, no additional energy (or power) can be sent to the ejection head 10 without negatively impacting ejection device performance. If the maximum of allowable substrate temperature rise is surpassed, performance and print quality, in the case of an ink ejection device, will be degraded.

Because power equals the product of energy and frequency, and the substrate temperature is a function of input power, there is thus a maximum jetting frequency for operation of such micro-fluid ejection devices. Accordingly, one goal of modern ink jet printing technology using the micro-fluid ejection devices described herein can be to maximize the level of jetting frequency while still maintaining the optimum chip temperature required for high print quality. While the optimum substrate temperature varies due to other design factors, it is generally desirable to limit the substrate temperature to about 75° C. to prevent excessive nozzle plate flooding, air devolution, droplet volume variation, premature nucleation, and other detrimental effects.

The disclosed embodiments improve upon the prior art micro-fluid ejection head structures 10 by reducing the number of protective layers in the micro-fluid ejection head structure, thereby reducing a total overcoat layer thickness for a micro-fluid ejection head structure. A reduction in overcoat thickness translates into less waste energy. Since there is less waste energy, jetting energy that was used to penetrate a thicker heater overcoat layer may now be allocated to higher jetting frequency while maintaining the same energy conduction as before to the exposed heater surface.

Figure 4:
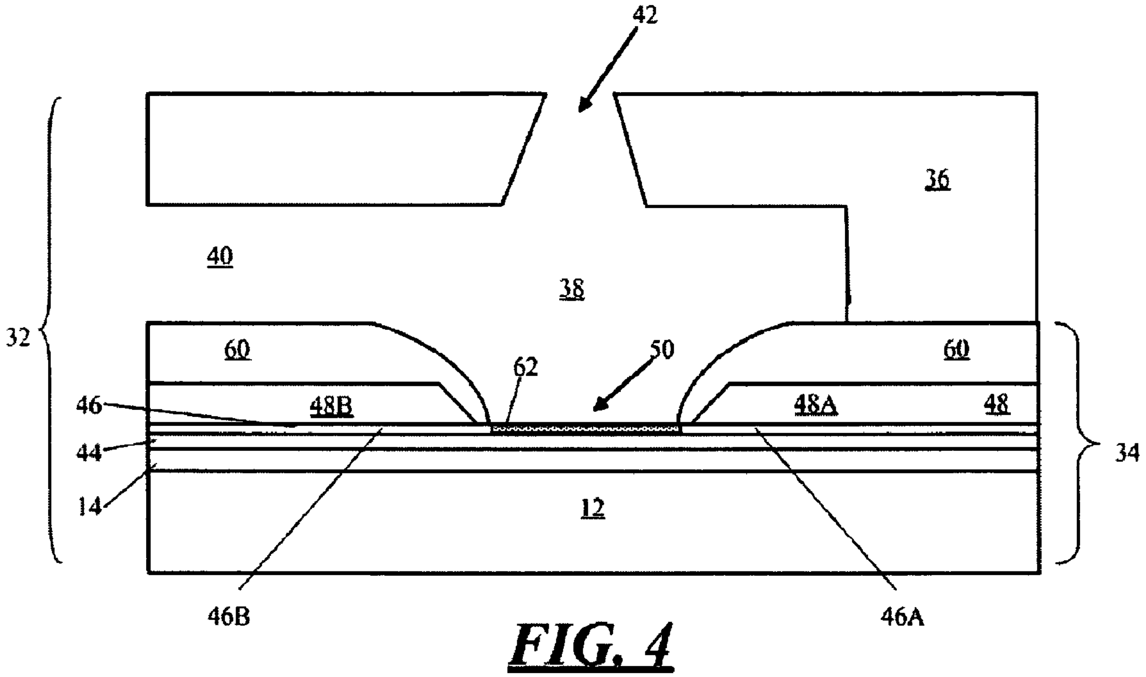
FIG. 4 is a cross-sectional view, not to scale, of a portion of a micro-fluid ejection head structure according to the disclosure.
Figure 5:
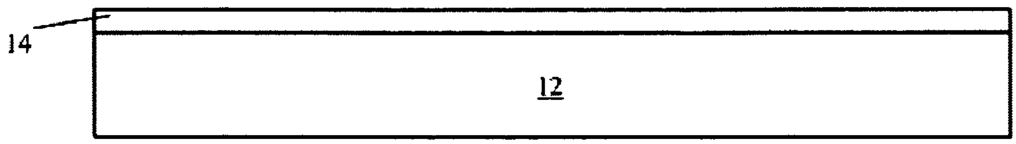
FIGS. 5-11 are cross-sectional views, not to scale, illustrating steps for making a micro-fluid ejection head structure according to the disclosure.

With reference to FIG. 4, a cross sectional view, not to scale, of a portion of a micro-fluid ejection head structure 32 containing a heater chip 34 and nozzle plate 36 according to the disclosure is provided. In the embodiment shown in FIG. 4, the nozzle plate 36 has a thickness ranging from about 5 to 65 microns and is preferably made from an ink resistant polymer such as polyimide. Flow features such as a fluid chamber 38, fluid supply channel 40 and nozzle hole 42 are formed in the nozzle plate 36 by conventional techniques such as laser ablation. However, the embodiments are not limited by the foregoing nozzle plate structure 36. In an alternative embodiment, flow features may be provided in a thick film layer to which a nozzle plate is attached or the flow features may be formed in both a thick film layer and a nozzle plate.

Figure 6:
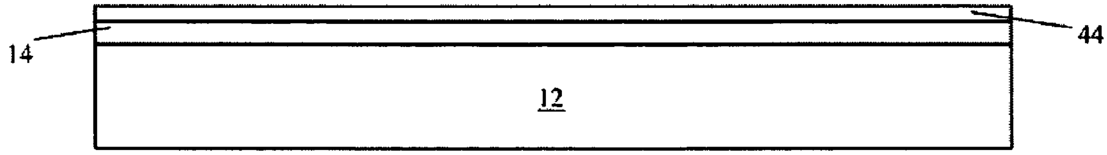

With reference to FIGS. 5-11, the layers of the heater chip 34 and process therefor will be described. The heater chip 34 includes the semiconductor substrate 12 and the insulating layer 14 as described above (FIG. 5). Conventional microelectronic fabrication processes such as physical vapor decomposition (PVD), chemical vapor deposition (CVD), or sputtering may be used to provide the various layers on the silicon substrate 12. A resistive layer 44 selected from the group TaAl, $Ta_2N$, TaAl(O,N), TaAlSi, TaSiC, Ti(N,O), WSi (O,N), TaAlN and TaAl/Ta is deposited, usually by conventional sputtering technology, on the insulating layer 14 (FIG. 6). The resistive layer 44 preferably has a thickness ranging from about 500 to 2,000 Angstroms. A particularly exemplary resistive layer 44 is composed of TaAl. However, the embodiments described herein are not limited to any particular resistive layer as a wide variety of materials known to those skilled in the art may be used as the resistive layer 44.

Figure 7:
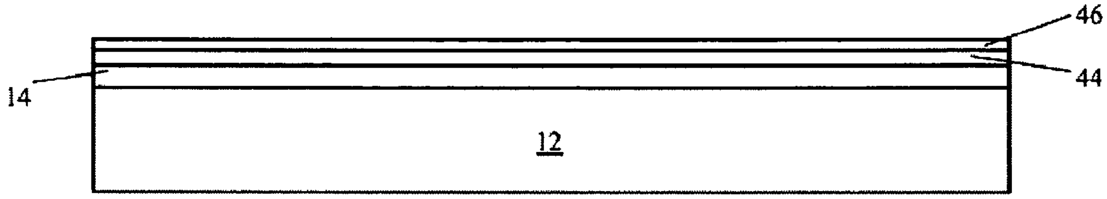
Figure 8:
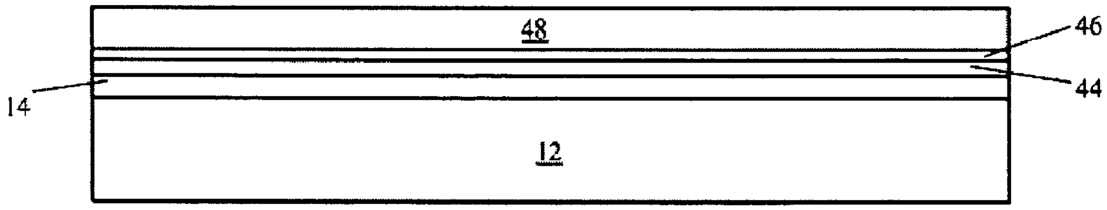

Next a sacrificial layer 46 selected from an oxidizable metal is deposited on the resistive layer 44 (FIG. 7). The sacrificial layer 46 preferably has a thickness ranging from about 500 to about 5,000 Angstroms, more preferably from about 1,000 to about 4,000 Angstroms, and is preferably selected from a group consisting of oxidizable metals such as tantalum (Ta), and titanium (Ti) that when oxidized have a tendency to exhibit more resistive rather than conductive properties.

A conductive layer 48 is then deposited on the sacrificial layer 46 (FIG. 8) and is etched to define a heater resistor 50 between conductors 48A and 48B as described above (FIG. 9). As before, the conductive layer 48 may be selected from conductive metals, including, but not limited to, gold, aluminum, silver, copper, and the like. Since the sacrificial layer 46 is selected from a metal rather than an insulating layer, there is desirable electrical conductivity from the conductors 48A and 48B to the resistive layer 44. Accordingly, the portions 46A and 46B of the sacrificial layer 46 below the ground and power conductors 48A and 48B exhibit a conductive rather than an insulative function. However, upon oxidation of the exposed portion 52 of the sacrificial layer 46 between the conductors 48A and 48B, the portion 52 of the sacrificial layer 46 exhibits a protective rather than a conductive function.

Figure 10:
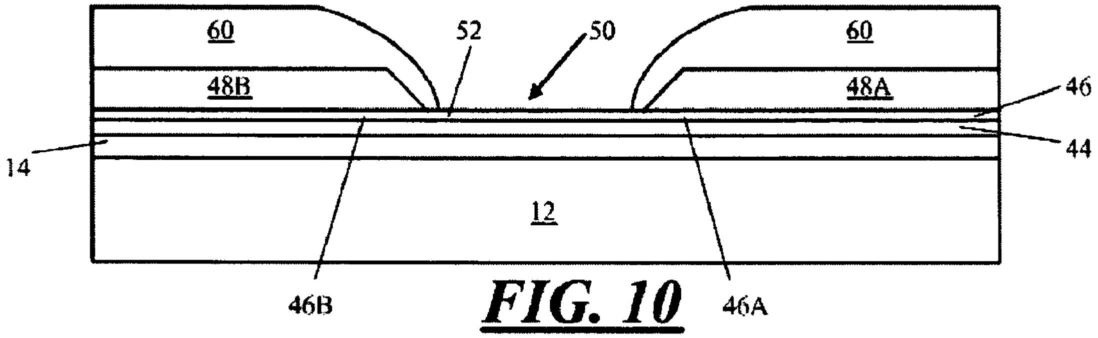

Next, a dielectric layer 60 is deposited on the electrodes 48A and 48B and sacrificial layer 46. The dielectric layer 60 has a thickness ranging from about 1,000 to about 8,000 Angstroms. The dielectric layer is selected from the group consisting of diamond-like carbon (DLC), doped-DLC, silicon nitride, and silicon dioxide. The dielectric layer 60 is etched to expose fluid in the fluid chamber 38 to the heater resistor 50 as shown in FIG. 10.

Figure 11:
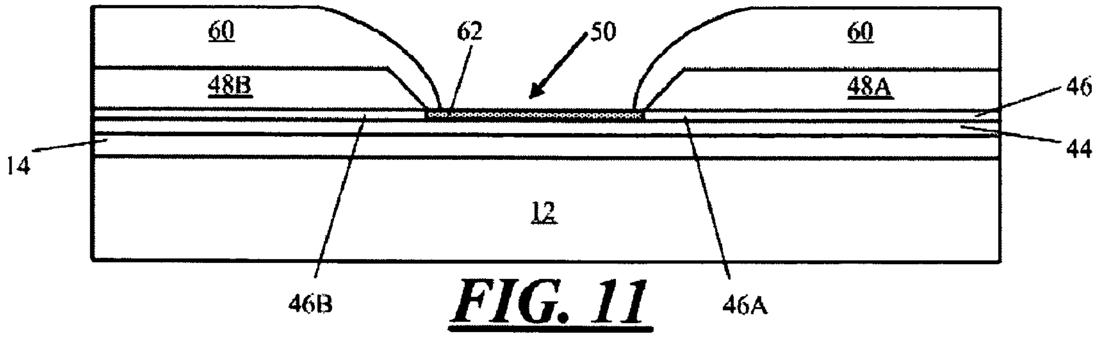

The heater surface 50, comprising the exposed portion of the sacrificial layer 52, is passivated by a chemical process such as oxidation to provide a passivated portion 62 (FIG. 11). In an exemplary embodiment, the entire thickness of the sacrificial layer 46 providing the exposed heater surface 50 is oxidized. By oxidizing the entire thickness of the sacrificial layer 46 in the exposed portion 52 of the passivation layer 46, the oxidized portion prevents an electrical short between the anode and cathode conductors 48A and 48B through the sacrificial layer portion 52. Methods for oxidizing the sacrificial layer portion 52 include, but are not limited to, a plasma-anodizing process or thermal treatment in an oxygen rich atmosphere.

A unique characteristic of the above described embodiment is that the unreacted portions (46A and 46B) of the sacrificial layer 46 continue to behave as conductors even after the oxidation process. Therefore, very little jetting energy is consumed between the resistive layer 44 and the anode 48A or cathode 48B. In other words, less jetting energy is required in order to generate the requisite energy level for fluid ejection to take place than if the unreacted portions 46A and 46B of the sacrificial layer 46 exhibited insulative rather than conductive properties.

Figure 12:
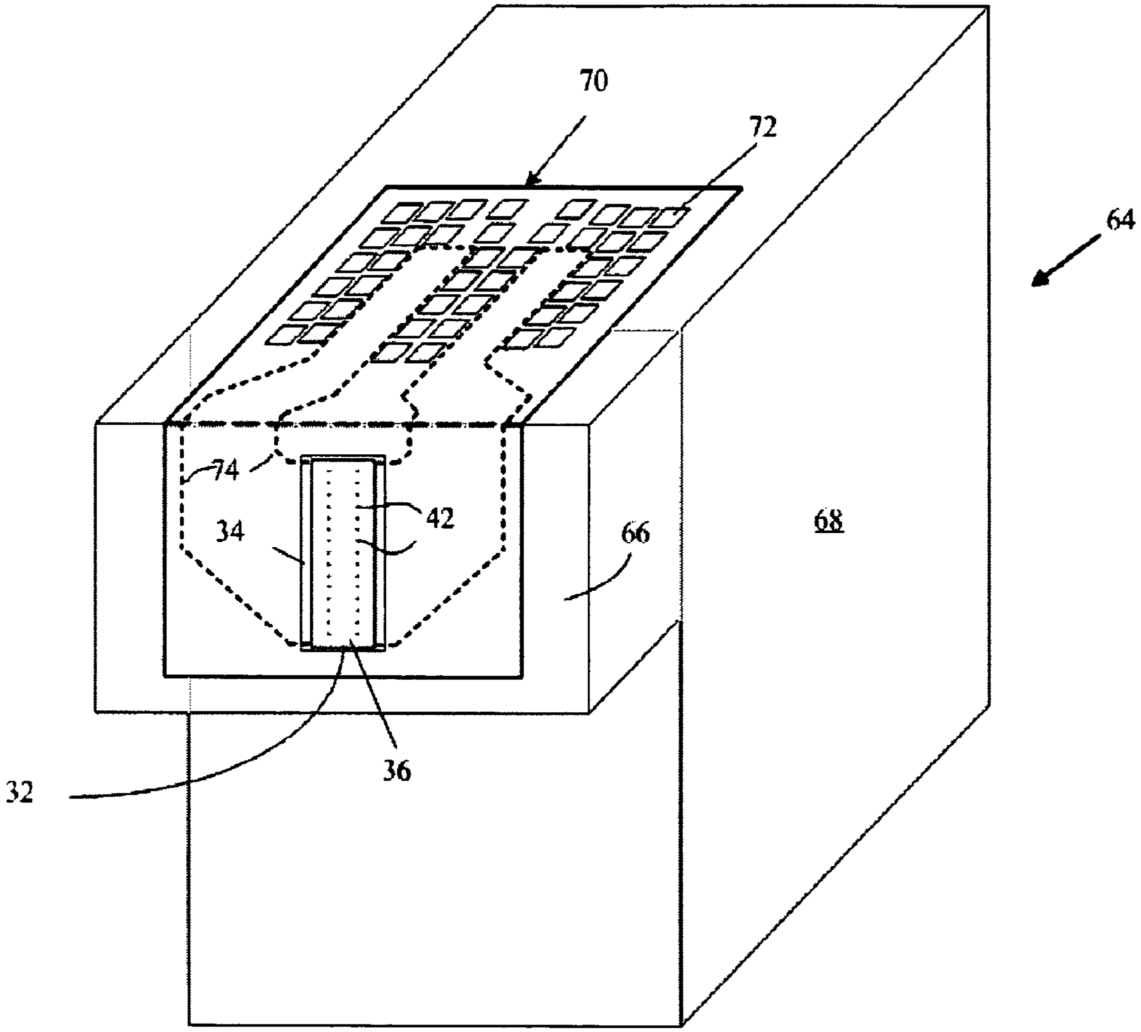
FIG. 12 is a perspective view, not to scale, of a fluid cartridge containing a micro-fluid ejection head structure according to the disclosure.

With reference to FIG. 12, a fluid cartridge 64 containing the micro-fluid ejection head structure 32 according to the disclosure is illustrated. The micro-fluid ejection head structure 32 is attached to an ejection head portion 66 of the fluid cartridge 64. The main body 68 of the cartridge 64 includes a fluid reservoir for supply of fluid to the micro-fluid ejection head structure 32. A flexible circuit or tape automated bonding (TAB) circuit 70 containing electrical contacts 72 for connection to a device such as the printer 11 is attached to the main body 68 of the cartridge 64. Electrical tracing 74 from the electrical contacts 72 are attached to the heater chip 34 to provide activation of ejection devices on the heater chip 34 on demand from a device 11 to which the fluid cartridge 64 is attached. The disclosure, however, is not limited to the fluid cartridges 64 as described above as the micro-fluid ejection head structure 32 according to the disclosure may be used in a wide variety of fluid cartridges, wherein the ejection head structure 32 may be remote from the fluid reservoir of main body 68.

Figure 13:
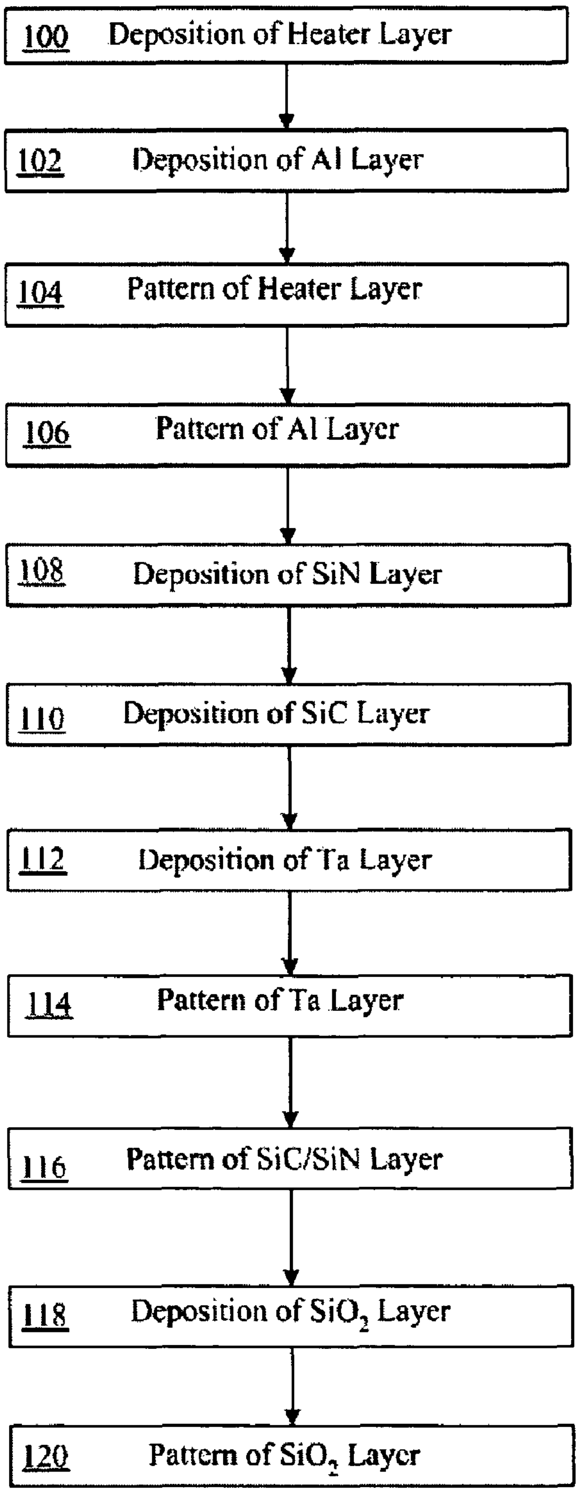
FIG. 13 Prior Art
FIG. 13 is a block flow diagram for a prior art heater stack process.

As will be appreciated, the process for forming the structure of the micro-fluid ejection head structure 32 described above is substantially shorter and less complicated than the process and associated steps in forming micro-fluid ejection device heater stacks found in the prior art (FIG. 1). Prior art process steps are disclosed in a block flow diagram 98 in FIG. 13. Steps 100 and 102 represent the deposition of the heater layer 16 and conductive layer 18, respectively, in a conventional micro-fluid ejection head structure 10. Step 104 represents the patterning of the heater layer 16 across the entire micro-fluid ejection head structure. Step 106 represents the patterning of the conductive layer 18 into electrodes, 18A and 18B, for each nozzle. Steps 108, 110, and 112 represent the deposition of two passivation layers 22 and a cavitation layer 26, respectively. These three layers are patterned in reverse order in step 114 (cavitation layer) and step 116 (passivation layers). Finally, steps 118 and 120 represent the deposition and patterning, respectively, of the dielectric layer 28. A minimum of eleven steps are required for the manufacture of a conventional micro-fluid ejection head structure 10 as described above on an insulated semiconductor substrate.

Figure 9:
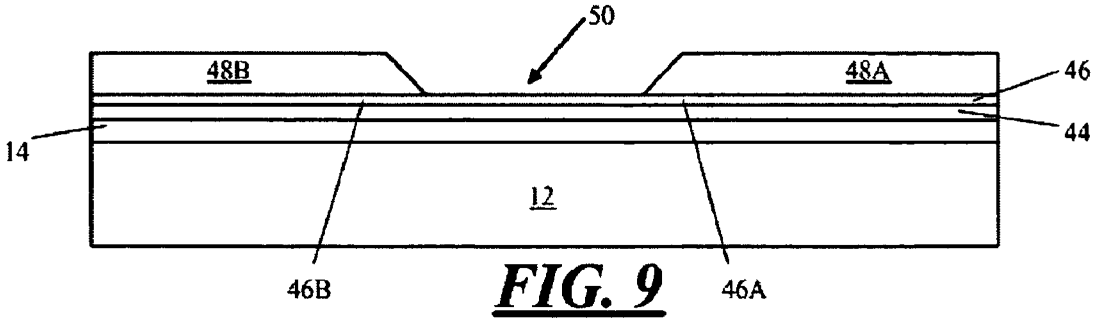
Figure 14:
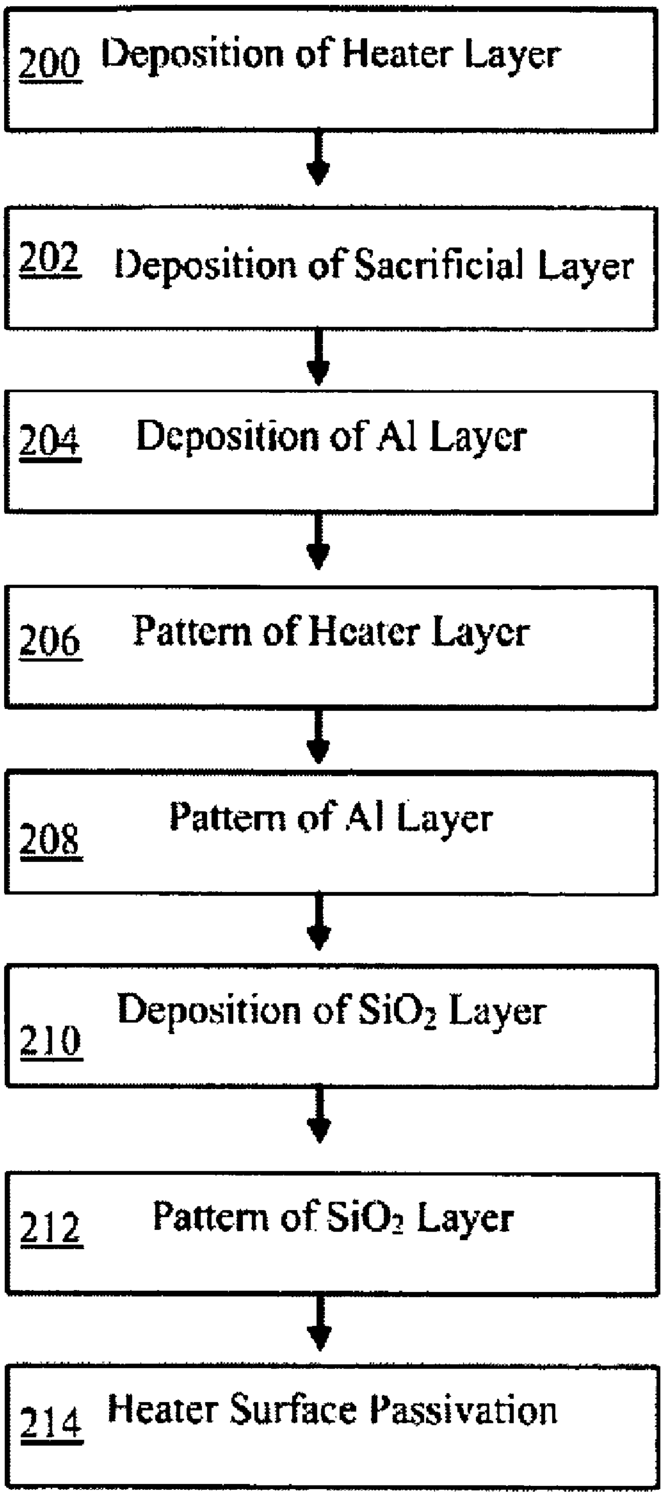
FIG. 14 is a block flow diagram for a heater stack process according to the disclosure.

FIG. 14 provides a block flow diagram 150 for the method according to the present disclosure. As is evident from the block flow diagram 150 of FIG. 14 there is a reduced number of process steps required for a micro-fluid ejection head structure 32 (FIG. 4) as compared to the process of FIG. 13 for prior art structure 10 (FIG. 1). In FIG. 14, step 200 is analogous to step 100 of FIG. 13 wherein a heater layer 44 is deposited (step 200) as shown in FIG. 6. At this point, however, a sacrificial layer 46 is deposited on the heater layer 44 (step 202). Then, the conductive layer 48 is deposited on the sacrificial layer 46 (step 204). The entire resistive layer 44, conductive layer 46, and sacrificial layer 48 are patterned (step 206). The conductive layer 48 is then patterned to form electrodes 48A and 48B as shown in FIG. 9 (step 208). The dielectric layer 60 is deposited directly on the sacrificial layer 46 and electrodes 48A and 48B (step 210). The dielectric layer 60 is patterned as shown in FIG. 10 (step 212). Step 214, the final step, includes the passivation of the exposed sacrificial layer 46 leaving a passivated portion 62.

When compared to the prior art, the process and device disclosed herein will save a manufacturer of micro-fluid ejection devices two deposition steps, two etching steps, and one lithography step. Referring back to FIG. 1, the first and second passivation layers, shown as layer 22 collectively, may be unnecessary in the disclosed process. Similarly, the cavitation layer 26 may also be unnecessary. In place of these layers would be the sacrificial layer 46. The simplified process disclosed herein saves both time and resources because less time is needed to process the disclosed heater stack configuration and less materials are necessary to build the structure. Less time and material requirements translate into overall process cost savings. Additionally, little or no new capital equipment for production of heater stacks according to the disclosure would be required because the process substantially fits current production equipment specifications.

Figure 15A:
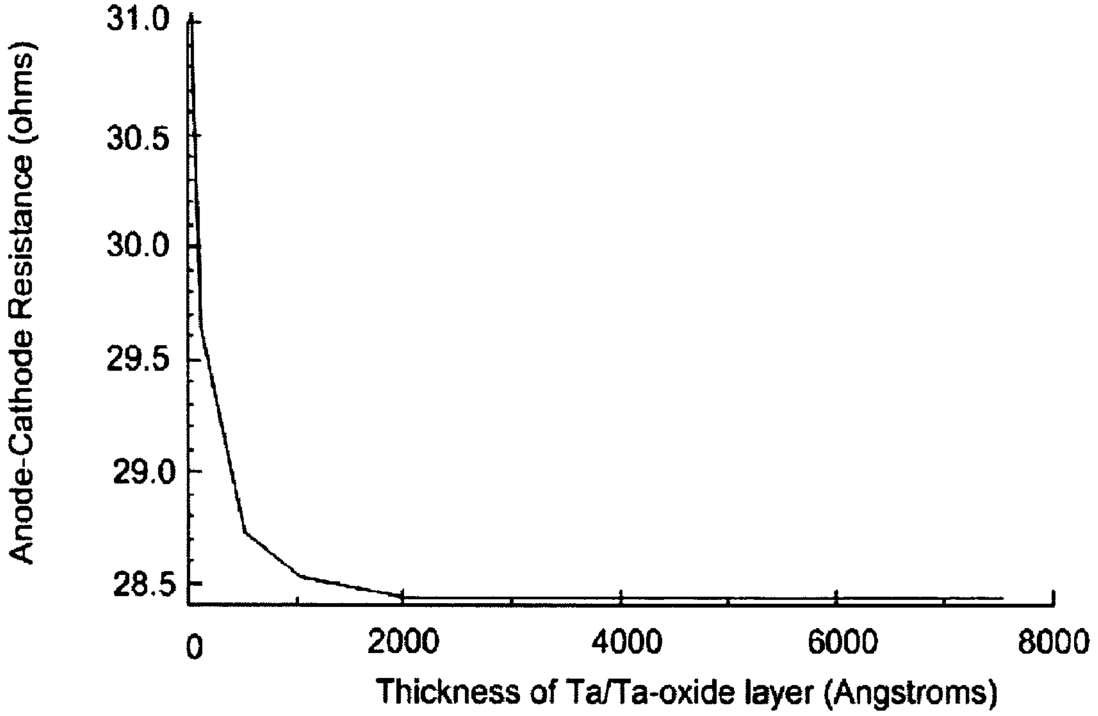
FIG. 15*a* is a graphical representation of the relationship between electrical resistance and $Ta/Ta_2O_5$ sacrificial layer thickness according to the disclosure.
Figure 15B:
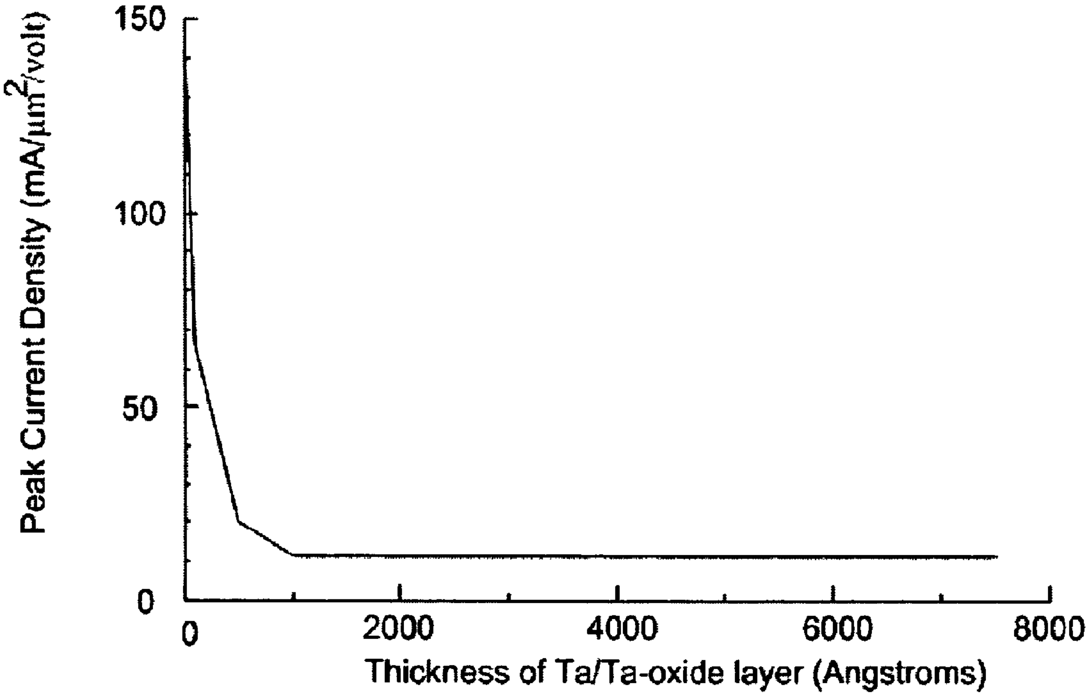
FIG. 15*b* is a graphical representation of the relationship between peak current density and $Ta/Ta_2O_5$ sacrificial layer thickness according to the disclosure.
Figure 16A:
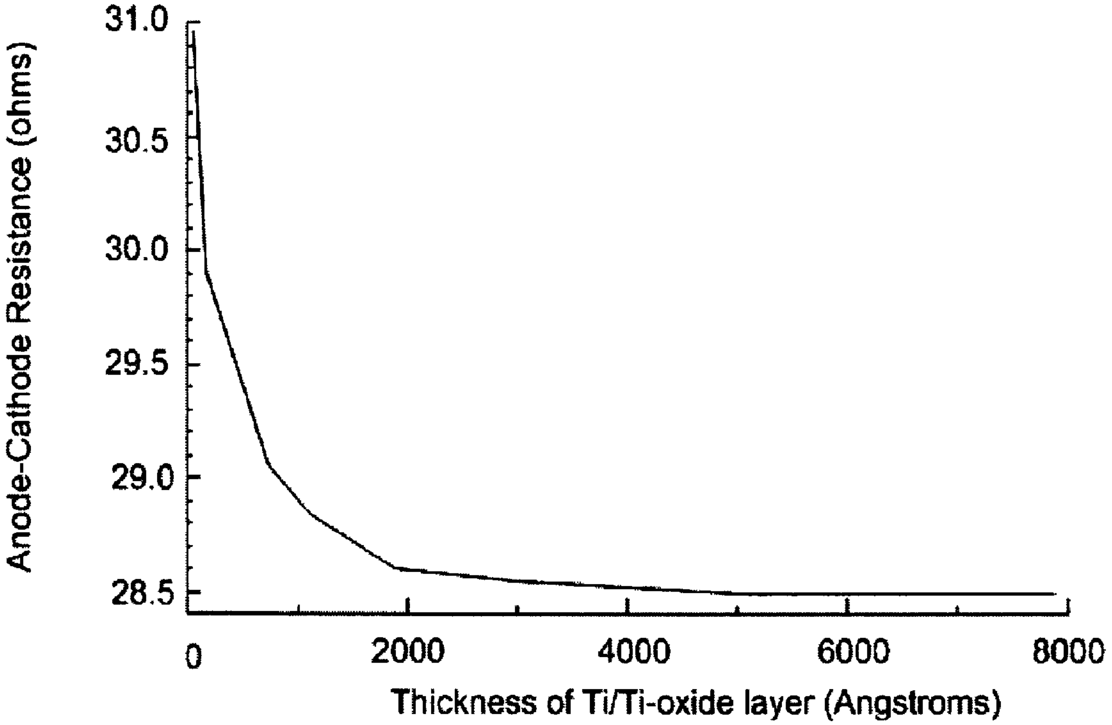
FIG. 16*a* is a graphical representation of the relationship between electrical resistance and $Ti/TiO_2$ sacrificial layer thickness according to the disclosure.
Figure 16B:
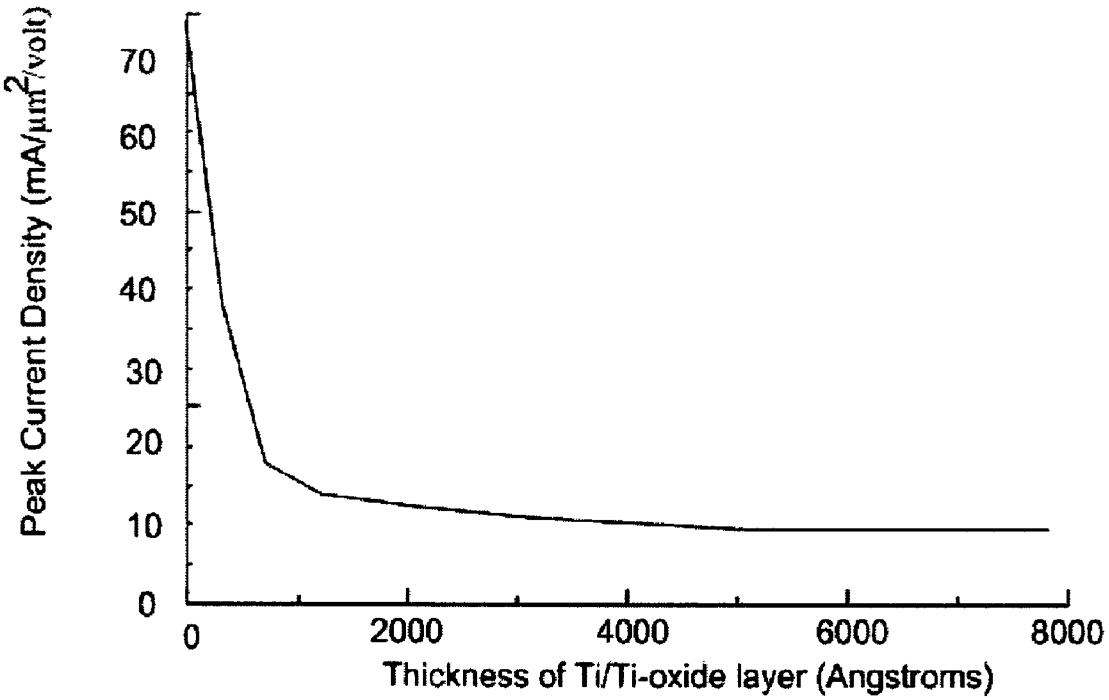
FIG. 16*b* is a graphical representation of the relationship between peak current density and $Ti/TiO_2$ sacrificial layer thickness according to the disclosure.

As shown in FIG. 11, the heater resistor 50 portion of the micro-fluid ejection head structure 32 described herein comprises an area of heater surface 50 between conductors 48A and 48B multiplied by the sum of the thickness of the sacrificial layer 46 and the resistive layer 44. The exemplary range of energy per unit volume in the heater resistor 50 portion ranges from about 2.7 GJ/$m^3$ to about 4.0 GJ/$m^3$ based on exemplary pulse times of less than 0.73 microseconds and exemplary overcoat thicknesses of less than about 7,200 Angstroms. The thickness of the passivated portion 62 is important because it partly defines the volume of the heater resistor 50 portion. Thinner passivated portions 62 may, at first blush, appear to be more desirable because less jetting energy is required to heat up a lesser volume of heater resistor 50 portion. However, as shown in FIGS. 15*a* and 15*b* demonstrating the use of Ta oxidized to $Ta_2O_5$, if a sacrificial layer 46 thickness of much less than about 1,000 Angstroms is used, the current density (measured in milliampere/$m^2$/volt) and resistance (measured in ohms) substantially increase. Similar results occur using Ti oxidized to $TiO_2$ as shown in FIGS. 16*a* and 16*b*.

Using sacrificial layers 46 less than about 1,000 Angstroms brings forth less obvious but, nonetheless, undesirable results such as asymmetric current density throughout the heater resistor 50 portion. The cause of such asymmetric current density is that the electrons must find a path through the sacrificial layer 46 in the vicinity of the edge of the electrodes 48A and 48B. However, the electrodes, often made of aluminum, exhibit a much lower bulk resistivity than the Ta, $Ta_2O_5$, Ti, or $TiO_2$ in the sacrificial layer 46. Using a sacrificial layer 46 of less than about 500 Angstroms results in a substantial increase in peak current density, greater resistance values in the sacrificial layer 46 contribute to asymmetric current density, and asymmetric current density is an undesirable property that yields unacceptable micro-fluid ejection device output results. Accordingly, a minimum exemplary thickness for the sacrificial layer 46 is about 500 Angstroms.

While specific embodiments of the invention have been described with particularity herein, it will be appreciated that the disclosure is susceptible to modifications, additions, and changes by those skilled in the art within the spirit and scope of the appended claims.

What is claimed is:

1. A method of making a micro-fluid ejection device structure comprising the steps of:

depositing an insulating layer adjacent to a substrate, the insulating layer having a thickness ranging from about 8,000 to about 30,000 Angstroms, depositing a resistive layer adjacent to the insulating layer, the resistive layer having a thickness ranging from 500 to about 1,500 Angstroms, depositing a sacrificial film layer adjacent to the resistive layer, the sacrificial film layer having a thickness ranging from about 500 to about 5,000 Angstroms, defining a plurality of heater resistors in the resistive layer and the sacrificial film layer, depositing a first metal conductive layer adjacent to the sacrificial film layer and etching the first metal conductive layer to define ground and address electrodes and a heater resistor there between for each of the plurality of heater resistors, depositing a dielectric layer adjacent to the heater resistors and electrodes, the dielectric layer having a thickness ranging from about 1,000 to about 8,000 Angstroms, etching the dielectric layer to provide an exposed surface of the sacrificial film layer comprising the plurality of heater resistors, and oxidizing the exposed surface of the sacrificial film layer to define a protective barrier on the plurality of heater resistors.

2. A method of making a printhead comprising depositing a second metal conductive layer adjacent to the dielectric layer and attaching a nozzle plate adjacent to the micro-fluid ejection device structure of claim 1.

3. The method of claim 1, wherein the first metal conductive layer comprises a metal selected from the group consisting aluminum, copper, and gold.

4. The method of claim 2, wherein each of the first and second metal conductive layers comprises a metal selected from the group consisting of aluminum, copper, and gold.

5. The method of claim 1, wherein the resistive layer is selected from the group consisting of and being selected from the group consisting of TaAl, $Ta_2N$, TaAl(O,N), TaAlSi, Ti(N, O), WSi(O,N), TaAlN, and TaAl/TaAlN.

6. The method of claim 1, wherein the sacrificial layer is selected from the group consisting of tantalum (Ta), and titanium (Ti).

7. The method of claim 1, wherein the dielectric layer is selected from the group consisting of diamond-like carbon (DLC), doped-DLC, silicon nitride, and silicon dioxide.

8. The method of claim 1, wherein portions of the sacrificial layer underlying the electrodes remain substantially conductive.

* * * * *